US009309121B2

(12) United States Patent
Gibson et al.

(10) Patent No.: US 9,309,121 B2
(45) Date of Patent: Apr. 12, 2016

(54) CARBON MICROBEADS WITH HIERARCHICAL STRUCTURE

(75) Inventors: Charles P. Gibson, Oshkosh, WI (US); Annamalai Karthikeyan, Oshkosh, WI (US)

(73) Assignee: WISYS Technology Foundation, Inc., Madison, WI (US)

(*) Notice: Subject to any disclaimer, the term of this patent is extended or adjusted under 35 U.S.C. 154(b) by 606 days.

(21) Appl. No.: 12/841,466

(22) Filed: Jul. 22, 2010

(65) Prior Publication Data

US 2011/0017493 A1    Jan. 27, 2011

Related U.S. Application Data

(60) Provisional application No. 61/227,501, filed on Jul. 22, 2009.

(51) Int. Cl.
| | | |
|---|---|---|
| *C01B 31/00* | (2006.01) | |
| *C01B 31/02* | (2006.01) | |
| *B01J 20/20* | (2006.01) | |
| *B01J 20/28* | (2006.01) | |
| *B01J 20/32* | (2006.01) | |
| *C01B 31/04* | (2006.01) | |

(52) U.S. Cl.
CPC ............ *C01B 31/02* (2013.01); *B01J 20/20* (2013.01); *B01J 20/28004* (2013.01); *B01J 20/324* (2013.01); *B01J 20/3293* (2013.01); *C01B 31/04* (2013.01); *B01D 2253/102* (2013.01); *B01D 2253/304* (2013.01); *Y02C 10/08* (2013.01); *Y10T 428/249921* (2015.04); *Y10T 428/2989* (2015.01)

(58) Field of Classification Search
USPC ........................................................ 427/227
See application file for complete search history.

(56) References Cited

U.S. PATENT DOCUMENTS

| | | | |
|---|---|---|---|
| 6,355,377 B1 | 3/2002 | Sheem et al. | |
| 7,323,120 B2 | 1/2008 | Mao et al. | |
| 2006/0029804 A1* | 2/2006 | Klett et al. | 428/408 |
| 2008/0044656 A1 | 2/2008 | Ko et al. | |
| 2008/0279756 A1* | 11/2008 | Zhamu et al. | 423/448 |
| 2009/0136849 A1 | 5/2009 | Yue et al. | |

OTHER PUBLICATIONS

Sevilla et al., "Easy Synthesis of graphitic carbon nanocoils from saccharides," Materials Chemistry and Physics 113, pp. 208-214 (Aug. 28, 2008).*

(Continued)

*Primary Examiner* — Robert Vetere
(74) *Attorney, Agent, or Firm* — Boyle Fredrickson, S.C.

(57) ABSTRACT

The preset invention is a hierarchically-structured carbon microbead and method for forming the microbead utilizing hydrothermal carbonization of a biomass/catalyst mixture to produce partially carbonized amorphous microspheres, wherein the biomass is an inexpensive material containing a high oxygen content component (e.g., sugar, starch, alcohol), and the catalyst is a metal or metal-containing compound, preferably a transition metal compound, and more specifically a transition metal selected from Fe, Co, Ni, Ru, Rh, Pd, Os, Ir, and Pt. Subsequently, a heat treatment is performed where the amorphous microspheres are heated to a temperature that is sufficiently high so as to result in carbonization, graphitization, and production of a carbonaceous coating or shell on the core of the microbead.

28 Claims, 6 Drawing Sheets

(56) References Cited

OTHER PUBLICATIONS

Mi et al., "A Simple solvothermal route to synthesize carbon microspheres," New Carbon Materials 24, pp. 375-378 (Dec. 2009).*
T. Li, et al., SEM Analysis of the Changes of Carbon Layer Structure of Mesocarbon Microbeads Heat-Treated at Different Temperatures, Chinese Science Bulletin, vol. 49, pp. 1105-1110, Jun. 2004.
A. Mabuchi, et al., Charge-Discharge Characteristics of the Mesocarbon Miocrobeads Heat-Treated at Different Temperatures, Journal of the Electrochemical Society, vol. 142, pp. 1041-1046, Apr. 1995.
K. Tatsumi et al., The Influence of the Graphitic Structure on the Electrochemical Characteristics for the Anode of Secondary Lithium Batteries, Journal of the Electrochemical Society, vol. 142, pp. 716-720, Mar. 1995.
Qing Wang, et al., Monodispersed Hard Carbon Spherules with Uniform Nanopores, Carbon 39, pp. 2211-2214, 2001.
Harry Marsh et al., Activated Carbon, Elsevier Ltd., pp. 100-101, 2006.
Sudip L. Batabyal et al., Green Chemical Synthesis of Silver Nanowires and Microfibers Using Starch, Journal of Biobased Materials and Bioenergy, vol. 1, pp. 143-147, 2007.
Shu-Hong Yu et al., From Starch to Metal/Carbon Hybrid Nanostructures: Hydrothermal Metal-Catalyzed Carbonization, Advanced Materials, vol. 16, pp. 1636-1640, Sep. 2004.
Y.-Z. Mi et al., A simple Solvothermal Route to Synthesize Carbon Microspheres, New Carbon Materials, vol. 24, pp. 375-377, May 2009.
Sevilla M et al; "Easy Synthesis of Graphitic Carbon Nanocoils from Saccharides"; Materials Chemistry and Physics, Elsevier, Switzerland, Taiwan, China; vol. 113, No. 1; Jan. 15, 2009; pp. 208-214.
Sevilla M et al.; "Direct Synthesis of Graphitic Carbon Nanostructures from Saccharides and Their Use as Electrocatalytic Supports"; Elsevier, Oxford, GB; vol. 46, No. 6; May 1, 2008; pp. 931-939.
Wang et al.; "Preparation of Carbon Mico-Spheres by Hydrothermal Treatment of Methylcellulose Sol"; Materials Lettrs, North Holland Publishing Co.; Amsterdam, NL; vol. 59, No. 28; Dec. 1, 2005; pp. 3738-3741.
Sevilla M et al.; "Synthesis of Graphitic Carbon Nanostructures from Sawdust and Their Application as Electrocatalyst Supports"; Journal of Physical Chemistry C 20070712; American Chemical Society US; vol. 111, No. 27; Jul. 12, 2007; pp. 9749-9756.
Mi et al.; "Synthesis of Carbon Mico-Spheres by a Glucose Hydrothermal Method"; Materials Letters, North Holland Publishing Company, Amsterdam, NL; vol. 62, No. 8-9; Jan. 15, 2008; pp. 194-1196.
Wang Q et al.; "Monodispersed Hard Carbon Spherules with Uniform Nanopores"; Cabon, Elsevier, Oxford, GB; vol. 39, No. 14; Nov. 1, 2001; pp. 2211-2214.
Sevilla M et al.; "The Production of Carbon Materials by Hydrothermal Carbonization of Cellulose"; Carbon, Elsevier, Oxford, GB; vol. 47, No. 9; Aug. 1, 2009; pp. 2281-2289.
Seviila M et al.; "Chemical and Structural Properties of Carbonaceous Products Obtained by Hydrothermal Carbonization of Saccharides"; Chemistry—A European Journal 20090414 Wiley-VCH Verlag Deu; vol. 15, No. 16; Apr. 14, 2009.
Database WPI, Week 200941, Thomson Scientific, London, GB; & CN 101 445 234 A; Univ Heilongjiang; Jun. 3, 2009.

* cited by examiner

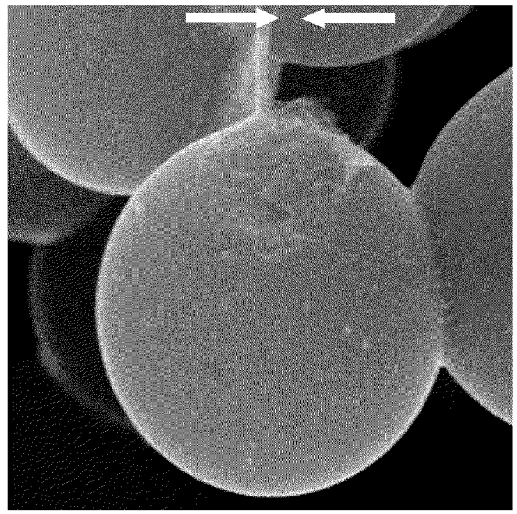
Figure 5
Figure 6
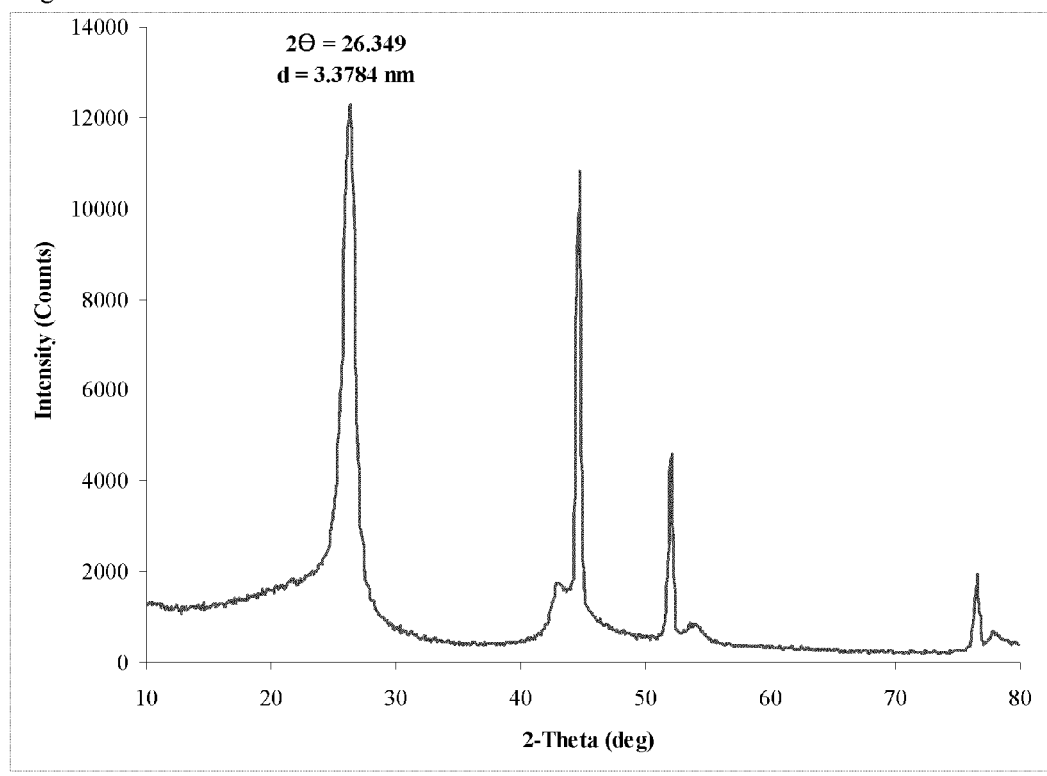

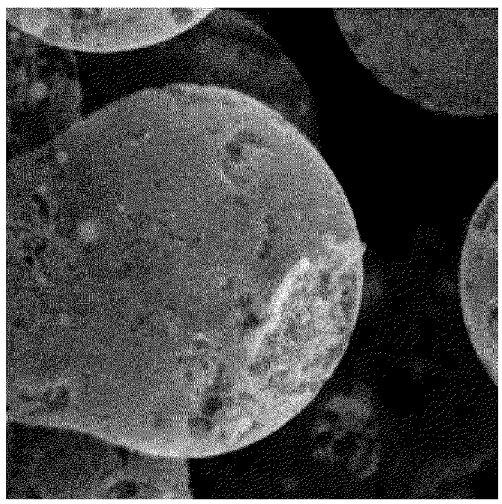 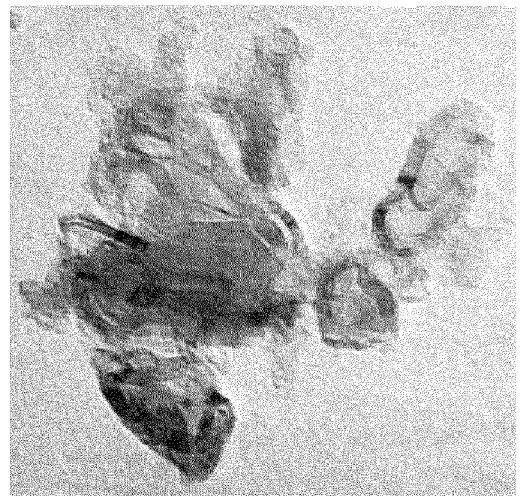
Figure 7.                    Figure 8.

US 9,309,121 B2

CARBON MICROBEADS WITH HIERARCHICAL STRUCTURE

CROSS REFERENCE TO RELATED APPLICATION

This application claims the benefit of U.S. Provisional Patent Application Ser. No. 61/227,501 filed Jul. 22, 2009 hereby incorporated by reference herein in its entirety.

FIELD OF THE INVENTION

The present invention relates to carbon microbeads with a novel and useful hierarchical structure. More particularly, the present invention relates to carbon microbeads comprising graphitic nanoparticles that are encapsulated by a thin smooth shell, and a method for making the same.

BACKGROUND OF THE INVENTION

The structure of materials can be classified by the general magnitude of various features being considered. The most common major classifications of structure:
  Bulk structure refers to the overall appearance of a large sample of the material.
  Macroscale structure, which includes features that can be seen with the naked eye, refers to structural features greater than about 0.1 mm in size.
  Microscale structure refers to structural features between about $0.1\mu$ and $100\mu$ in size.
  Nanoscale structure refers to structural features between 1 nm and 100 nm in size.
  Atomic-level structure, which includes features that are on the atomic level of size, refers to structural features less than 1 nm in size.

Structural features at all different levels affect the properties of a material. Accordingly, there is a great deal of interest in creating materials wherein all levels of structural detail correspond to specific desired features. Materials that satisfy this requirement are said to have hierarchical structure.

Organic precursors can be carbonized to give a wide variety of carbonaceous products having different structural features. These structural differences are present at various size regimes, and include atomic-level features (e.g., graphitic vs. non-graphitic), nanoscale features (e.g., microporous vs. mesoporous), microscale features (e.g., carbon black aggregates vs. carbon microbeads), macroscale features (e.g., conchoidally fractured particles vs. granular powder), and bulk features (e.g., powder vs. chunks). All of these structural details affect the physical properties of the product, and these, in turn, determine use. Accordingly, there is a great deal of interest in creating new types of carbon that have new and useful sets of structural features. One of the objects of this invention is to provide a type of carbon having a new and useful hierarchical structure.

Carbon powders are well known and are most commonly made by comminution of larger particles or chunks, such as comminution of chunks of the mineral graphite. However, of greater relevance to this invention are carbon powders that are made from liquids such as pitch. Processing pitch under appropriate conditions leads to the production of a material referred to as mesocarbon microbeads (MCMB). This material is not completely carbonized, but rather corresponds to liquid crystalline phase (i.e., mesophase) of polyaromatic hydrocarbons. Carbonization of this material can be completed by an appropriate heat treatment, which produces carbon microbeads. Carbon microbeads formed in this manner are generally graphitizable, meaning that they are non-graphitic (turbostatic) when formed at temperatures less than some critical value (typically 2000° C.), but can be converted to a graphitic material when heated above this temperature. Graphitic carbon microbeads produced by this method generally have one or (at most) a few domains, with each domain having a laminar nanostructure. Graphitic carbon microbeads produced from MCMBs have been intensely investigated for use in Li-ion battery anodes.

A major problem with these materials is that they are relatively expensive due to complex manufacturing processes and high processing temperatures (2000-3000° C.) required for graphitization. Strategies to reduce the cost to produce graphitic carbon microbeads can focus on use of less expensive starting materials, less expensive processing conditions, or both.

The use of biomass as a starting material is particularly attractive because it includes a variety of inexpensive and renewable sources. It was recently shown that hydrothermal processing of solutions containing sugar or starch will produce carbonaceous microspheres. A representative example is given by Huang, et al. In this case, a sugar solution was heated in an autoclave to 190° C. to produce a black powder, which was separated and then heated to 1000° C. under Ar in a tube furnace. The final product was hard (i.e., amorphous) carbon microspheres. Huang pointed out that the formation of these microspheres proceeds by a very different mechanism than the formation of graphitic carbon microbeads from MCMBs. Specifically, MCMBs have a liquid crystalline structure that is well disposed for subsequent conversion to graphitic carbon, whereas intermediates formed from sugar or starch lack this liquid crystalline structure. Without discussing the details, Marsh and Rodriguez-Reinoso summarize the general rule: "Carbons prepared from such materials as sugar and starch, because of their high oxygen content, do not form graphitizable carbons."

Graphitic carbon microbeads made by high temperature treatment (HTT) of MCMBs do not perform well in some applications, such as anodes for Li-ion batteries. In this application, the graphitic carbon microbeads are prone to deterioration as the graphitic lamina flake off due to stresses caused by size changes that accompany charge/discharge processes. An attractive strategy to reduce flaking is to provide a protective outer coating. A representative example of this approach is given by Mao et al. in U.S. Pat. No. 7,323,120. In one of their examples, Mao, et al. treat a suspension of MCMB with a solution of petroleum pitch dissolved in xylene. Pitch-coated MCMB particles were recovered and then graphitized by HTT (3000° C.). The product is similar to other graphitic microbeads made by HTT of MCMBs (i.e., a microbead comprising few domains, each having laminar nanostructure), except that the entire bead was coated with a protective layer. The example given by Mao gave a product that wherein the coating accounted for 8.7% of the mass of the product, which can be shown to correspond to a coating thickness of about 90 nm. The authors demonstrated that the graphitic carbon microbeads produced by this method performed better than uncoated microbeads in Li-ion battery anodes.

SUMMARY OF THE INVENTION

One aspect of this invention is to provide a protective outer coating for graphitic carbon microbeads, wherein the microbeads have structural features that are different than those produced from MCMBs. In one embodiment, the present invention includes a high surface area, hierarchically-structured carbon microbead product having the following new and unique combination of structural features:

Bulk structure: the product is a carbon powder or a sintered carbon powder.

Macroscale structure: The individual particles in the powder are too small to be resolved with the naked eye, but aggregates of particles may be observed.

Microscale structure: The particles in the powder are:

Generally spherical, having an average diameter between 0.5 and 100μ.

Have a core/shell microstructure.

Nanoscale structure:

The particle cores are nanostructured and correspond to aggregates of nanoparticles.

The particles are microporous or mesoporous.

Atomic level structure: The nanoparticles are made from carbon atoms, which are organized in a regular crystalline (graphitic) arrangement.

Another aspect of this invention is to provide a nanocomposite comprising hierarchically-structured carbon microbeads as described above, in combination with metal or metal oxide nanoparticles or microparticles.

Yet another aspect of this invention is to provide a relatively simple and inexpensive method for producing hierarchically-structured carbon microbeads. In particular, in one embodiment the present invention provides a low-cost process for converting biomass, and in particular sugars and starches, to carbon microbeads containing graphite nanocrystals.

Still another aspect of the present invention is to provide an energy storage device, such as a battery or capacitor, including the hierarchically structured carbon microbeads. In particular, in one embodiment the present invention, the hierarchically structured carbon microbeads are combined with one or more other components (e.g., binder) to create electrodes for batteries (i.e., Li-ion battery anodes). In another embodiment, the hierarchically structured carbon microbeads are combined with one or more other components (e.g., binder) to create electrodes for double-layer electrochemical capacitors (i.e., supercapacitors).

Other aspects, features and advantages of the present invention will be made apparent from the following detailed description taken together with the drawing figures.

BRIEF DESCRIPTION OF THE DRAWINGS

FIG. 5 is an SEM image of the hierarchically-structured product (CS/Ni-HT-85) of FIG. 3 showing the thickness of the coating.

FIG. 6 is an x-ray diffraction pattern of CS/Ni-HT-85 of FIG. 3, which shows that carbon atoms are organized in a regular crystalline (graphitic) arrangement.

FIG. 7 is an SEM image of a product (CS/Ni-HT-85-504) obtained by steam activation of CS/Ni-HT-85 of FIG. 3.

FIG. 8 is a TEM image showing graphene platelets produced by dismembration of Cs/Ni-HT-85 of FIG. 3.

DETAILED DESCRIPTION OF THE INVENTION

Figure 1:
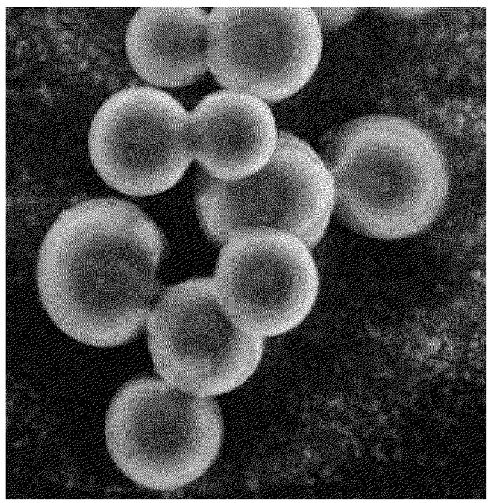
FIG. 1 is an SEM image of the initial product (CS/Ni-HT) formed according to the present invention by hydrothermal processing of corn starch and catalyst showing the core/shell microstructure of the initial product.

One aspect of the present invention is a type of graphitic carbon microbead that has a new and unique combination of structural features comprising:

A high degree of crystallinity (>50%), as determined by x-ray diffraction using the formula:

$$DC=[(d_{ac}-d_{002})/(d_{ac}-d_g)]\times 100$$

Where:

$d_{ac}$ is the spacing between carbon layers of a standard sample of (non-graphitized) activated carbon, as revealed by the 002 diffraction peak. ($d_{ac}$=3.82 Å)

$d_g$ is the spacing between graphene layers of a standard sample of high-quality synthetic graphite, as revealed by the 002 diffraction peak. ($d_{ac}$=3.35 Å)

$d_{002}$ is the spacing between graphene layers in the product, as revealed by the 002 diffraction peak.

An interior that has a non-laminar nanostructure corresponding to aggregated graphite nanocrystals.

An overall spherical shape, with average particle dimension in the range of 0.5 to 250 μm.

A thin smooth coating, which typically has a thickness less than 10 percent of the diameter of the particle.

A collection of pores, channels or both, which increase the accessible surface area.

The carbon microbeads described herein have a high degree of crystallinity (>50%). Microbeads having similarly high degrees of crystallinity have been made from MCMBs, but these products have a laminar microstructure rather than a non-laminar aggregated nanostructure.

Graphitic materials having aggregated nanostructure have been made by other methods, such as by combustion of fuels, but these materials, but these products do not have a microbead microstructure, and they do not have a core/shell microstructure.

As discussed above, coated graphitic carbon microbeads have been produced by modification of MCMBs. Also, porous graphitic carbon microbeads have been produced from MCMBs. However, graphitic carbon microbeads produced from MCMBs have a laminar nanostructure rather than a non-laminar aggregated nanostructure, and they do not have a core/shell structure.

Another aspect of the present invention is to provide a simple and relatively inexpensive process to create a type of hierarchically-structured carbon microbead having the new and unique combination of structural features described above. The process includes the following steps:

Hydrothermal carbonization of a biomass/catalyst mixture to produce partially or incompletely carbonized amorphous microspheres, wherein the biomass is an inexpensive material containing a high oxygen content component (e.g., sugar, starch, alcohol), and the graphitizing catalyst is a metal or metal-containing compound, preferably a transition metal compound, and more specifically a transition metal selected from Fe, Co, Ni, Ru, Rh, Pd, Os, Ir, and Pt.

A subsequent carbonization step, wherein the amorphous microspheres are heated to a temperature that is sufficiently high (400° C. to 3000° C., or preferably 400° C. to 2000° C., or more preferably 400° C. to 1200° C.) so as to result in carbonization, graphitization, and production of a carbonaceous coating.

An optional step to remove the graphitization catalyst.

An optional activation step that removes a portion of the coating, consequently increasing the surface area of the microspheres.

Hydrothermal carbonization of high-oxygen content biomass is an active area of research. Marsh et al. teach that this processes does not give graphitizable carbon.[5] Thus, Huang et al. report that hydrothermal carbonization followed by heat treatment yields carbon microspheres, but they are amorphous (i.e., hard carbon).[4]

A number of reports have recently appeared describing hydrothermal carbonization of high-oxygen content biomass in the presence of metal particles or metal compounds. For example, Basu et al. and Yu et al. report that hydrothermal carbonization of starch in the presence of silver ions gives silver nanowires, which are encapsulated with a carbonaceous coating. However, the carbonaceous coatings in these products are presumably amorphous since the authors do not report any graphitic peaks in the x-ray diffraction patterns, and high-magnification transmission electron micrographs fail to show the presence of graphitic fringes. In any event, these products are nanowires, not carbon microspheres.

Sun et al. report hydrothermal carbonization of glucose followed by treatment with colloidal silver. In this case, the addition of silver results in some graphitization of the product, but carbonization of the product is far from complete, and the degree of graphitization is very low (i.e., mostly amorphous). In addition, the product lacks the structural features produced in the present invention.

Mi et al. report that carbon microbeads can be produced by hydrothermal carbonization of ethanol in the presence of nickel bis(acetoacetonate). In this case, the hydrothermal processing step requires both high temperature (500° C.) and the nickel salt. Mi speculates that the first step in the process is nucleation of nickel nanoparticles, which then catalyze the ethanol carbonization. Mi et al claim that this leads to the formation of nanoparticles with an onion-skin laminar nanostructure, but no experimental evidence is presented supporting this hypothesis. Both x-ray diffraction data and Raman spectroscopy indicate that graphitic carbon is present, but that the degree of graphitization is low (i.e., mostly amorphous). In addition, electron micrographs show that this product lacks the structural features (i.e., non-laminar aggregated nanostructure and coating) produced by the present invention.

In brief, the composite materials of the present invention, such as the carbon and carbon/transition metal composite materials, nanoparticles or microbeads, are made by hydrothermal reaction of the carbon precursor, such as alcohols, glycols, sugars, polysaccharides, starches, cellulosic materials, esters, amides, amino acids, peptides or combinations thereof with a high oxygen content, preferably more than 20% w/w, and a graphitizing catalyst, optionally with a substance that provides a liquid under solvothermal conditions, such as water, but which can be the organic precursor as well, such as ethanol. Additionally, the microbeads produced after this step do not include a liquid crystalline structure and have a relatively low porosity.

After treatment at solvotheremal conditions, between 150° C. to 500° C., or more preferably 150° C. to 250° C., such as in a hydrothermal reactor, the resulting composition or carbonaceous material/microbeads are then heated to high temperatures, between 400° C. and 3000° C., or more preferably 400° C. to 1200° C. to result in carbonization, graphitization and production of a carbonaceous coating on the material/microbeads. In one embodiment, this step can be performed above 500° C. under solvothermal conditions, and/or can be performed by microwave treatment. The resulting material/microbeads from this carbonizing step taking the form of generally spherical microbeads with a high surface area of greater than 100 $m^2/g$, and a diameter of 0.5 μm to 250 μm, preferably 0.5 μm to 100 μm, more preferably 0.5 μm to 50 μm, and most preferably 0.5 μm to 20 μm. When the graphitizing catalyst includes a metal, the resulting microbeads can be ferromagnetic, ferrimagnetic, or superparamagnetic, and can be catalytically active.

Subsequently from the carbonization step, or optionally concurrently with the carbonization step, the material can be treated utilizing a suitable thermochemical treatment in an activation step to remove the coating, either partially or completely removing the coating from the material to open up the carbonaceous material, resulting in a material having very high surface area (>450 $m^2/g$) and porosity. The subsequent thermochemical treatment can be a physical or chemical activation step, such that the activation step can take the form exposing the material to steam, oxygen, air, carbon dioxide, carbon monoxide, potassium hydroxide or zinc chloride, among other compounds, under suitable conditions.

Additionally, the method can include a step wherein treatment with acid or other suitable chemical method is used to remove the catalyst, or other metals or metal compounds, from the resulting material after the carbonization step.

Further, if desired, the method can include a dismembration step, such as an ultrasonic dismembration step, performed on the material after the carbonization step suspended in water or another suitable liquid, that forms graphene from the material.

Figure 10:
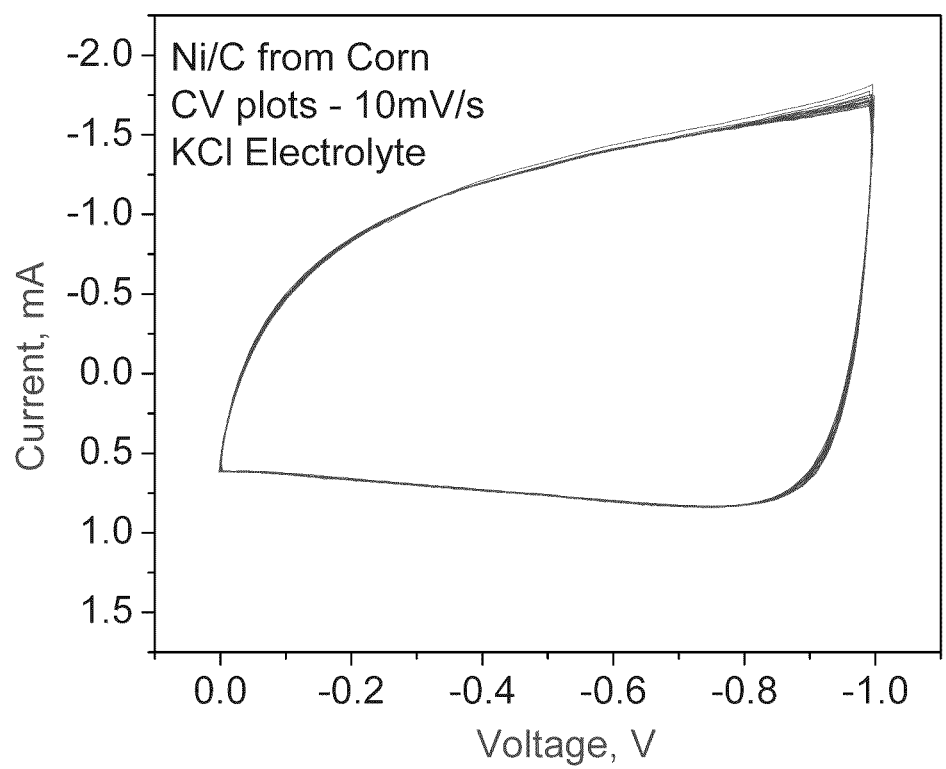
FIG. 10 is a cyclic voltammogram showing the electrochemical performance of a supercapacitor electrode fabricated in accordance with this invention.
Figure 11:
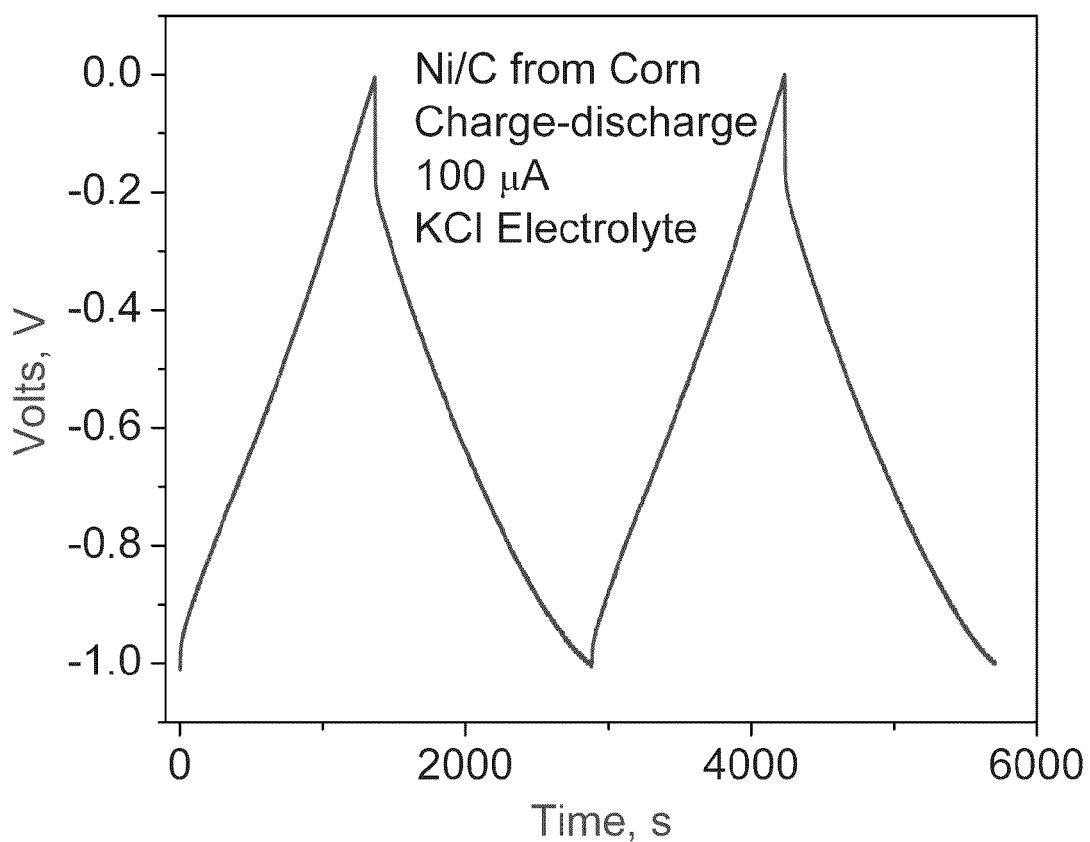
FIG. 11 is a graph showing the charge-discharge performance of a supercapacitor electrode fabricated in accordance with this invention.

As a result of these properties, the materials have application in the formation of batteries and capacitors with high capacitance (FIG. 10) and high cyclability (FIG. 11) due to the high specific capacity of the resulting materials. Thus, the materials can be used to form structures having varying applications, such as in a sorbent material including the microbeads, an electrode or electrode coating containing the microbeads (FIG. 9), such as that disclosed in co-pending PCT Application PCT/US10/24539, which is incorporated by reference herein in its entirety, a sintered body containing the microbeads, or a carbon-carbon composite containing the microbeads, among others.

Figure 9:
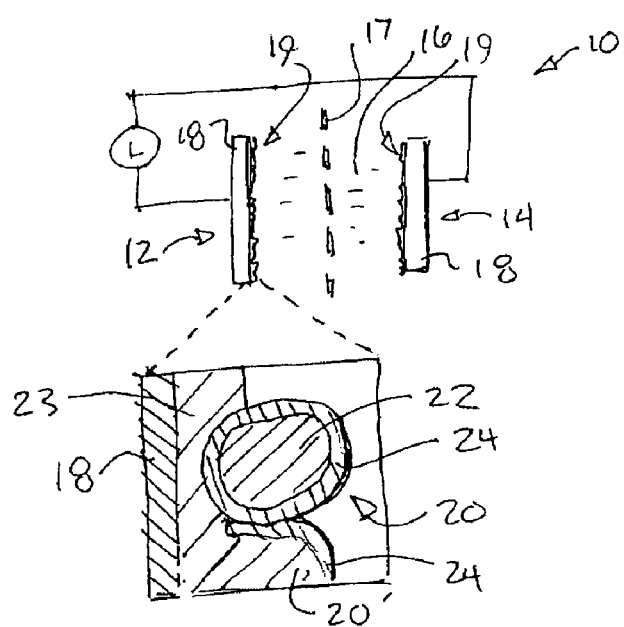
FIG. 9 is a simplified diagram of a supercapacitor suitable for using an electrode of the present invention showing an idealized representation of the electrode micro/nanostructure.

Concerning the capacitor in FIG. 9, a supercapacitor 10 employing the present invention may provide for a first capacitor plate 12 opposed to a second capacitor plate 14. The plates 12, 14 shown are generally planar; however, as will be understood in the art, they may generally be wound as interleaving spirals to provide a more compact volume and other topologies are also possible.

The plates 12 and 14 may be of different or identical materials and may be constructed of an electrically continuous conductor 18 having a rough or porous coating 19 thereon. The coating 19 is intended to provide a high surface area and, in the preferred embodiment, is composed of carbon microbeads 20 having an interior portion 22 and a surface region 24 in electrical communication with the continuous conductor 18 and electrolyte 16. The carbon microbeads 20 may not be discrete but made from part of a continuous porous structure.

The plates 12, 14 with coating 19 may be in communication with an electrolyte 16 and may be optionally separated by a porous spacer 17 allowing passage of the electrolyte therethrough but providing an insulating barrier against contact of the plates 12, 14.

The nanoparticles 20 may be attached to the continuous conductor by a conductive polymer or polymer composite material 23. The conductive material 23 may contain different forms of carbon including carbon fiber and annotates, a conducting polymer, metals or metal compounds from the group of silver, nickel, gold, platinum, tantalum or other metals and their alloys and need not, and generally will not be planar. Alternatively, the continuous conductor 18 may be identical with the conductive material 23 and may, for example, be a polymer carbon composite. Generally, the ceramic nanoparticles 20 may be non-sintered, partially sintered, amorphous phase or partially amorphous phase.

The nanoparticles 20 may be applied to the plates 12 and 14 by thin film coating procedures such as sol-gel coating, ceramic slurry coating, sputtering or the like. The nanoparticles 20 may be joined to each other and the plates 12 or 14 using a binder such as poly(tetrafluoroethylene), poly(vinylidene fluoride), poly(vinyl alcohol).

EXAMPLES

It is believed that this disclosure and the examples recited herein are sufficient to fully describe the present invention and allow one skilled in the art to practice the invention. No limitations upon the scope of the invention are to be drawn from the examples included herein.

Example 1

A 50 mL beaker was charged with 1.40 g corn starch (Argo), 0.50 g $Ni(NO_3)_2 \cdot 6H_2O$ and 20 mL of room-temperature deionized water. The mixture was heated on a hot plate while stirring with a glass stir rod until a viscous gel formed. 13.03 grams of this gel was transferred to a PTFE cup (23 mL capacity), which was then sealed into a pressure vessel (Parr model 4749), which was then placed in a 200° C. oven. After three days in the oven, the pressure vessel was removed and allowed to cool naturally to below 100° C. The vessel was opened revealing a yellowish liquid and dark (brown-black) solid residues. The liquid was decanted, and the solids were washed with a small amount of deionized water. Residual water was removed by heating the sample at 60° C. in a vacuum oven. The isolated yield of the product was 0.26 grams (Product CS/Ni-HT)

Figure 2:
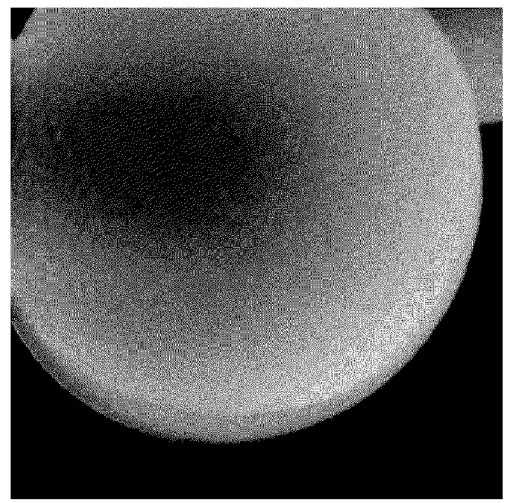
FIG. 2 is an SEM image of the initial product (CS/Ni-HT) of FIG. 1 showing the core/shell microstructure of the initial product.

Examination of this product using scanning electron microscopy (SEM) revealed microspheres that were typically 5-25μ in size, and which had an unusual microstructure comprising a relatively dense core encapsulated by a less dense and relatively thin outer layer (FIGS. 1 and 2). During SEM imaging, relatively brighter/darker regions were observed in the space between the denser inner core and the outermost layer of the microsphere, and these regions appeared to circulate around the inner core during imaging. The most straightforward explanation for this behavior is that the space between the inner core and outermost surface contains fluid, and the non-uniform heating of the microspheres during imaging causes the fluid to circulate. Most of the particles appeared to be joined together in small chains or aggregates, with joined particles sharing a neck that was generally less than about one quarter of the microbead diameter.

X-ray diffraction analysis of CS/Ni-HT gave a featureless diffraction pattern, which is indicative of an amorphous product. The product failed to show any response to a strong magnet, which indicates that nickel was present in the as $Ni^{2+}$, rather than ferromagnetic metallic Ni or superparamagnetic Ni nanoparticles. BET analysis ($N_2$ adsorption at 77K) revealed that the sample had a very low surface area (<1 $m^2/g$), which indicates a non-porous product. Thermogravimetric analysis revealed that the product lost considerable weight (>45%) when heated in an inert atmosphere (Ar), which indicates that carbonization was incomplete.

Examples 2-6

The process described in Example 1 was repeated, except that other polysaccharides or sugar were substituted for corn starch. Except for microbead size and polydipersity, the products were generally similar to CS/Ni-HT. Table 1 gives a summary of starting materials used and relative particle size and polydispersity:

TABLE 1

| Example | Starting material | Sample ID | Size and polydispersity relative to CS-HT |
| --- | --- | --- | --- |
| Example 1 | Corn strach | CS/Ni-HT | — |
| Example 2 | Wheat starch | WS/Ni-HT | About the same size and polydispersity. |
| Example 3 | Sucrose | SC/Ni-HT | About the same size and polydispersity. |
| Example 4 | Dextran | DT/Ni-HT | About the same size; slightly higher polydispersity. |
| Example 5 | Rice starch | RS/Ni-HT | Smaller microbeads; about the same polydispersity. |
| Example 6 | Potato starch | PS/Ni-HT | Microbeads generally smaller, high polydisperisty. |

Example 7

An alumina boat was charged with 0.2553 grams of the product made in Example 1 (CS/Ni-HT). The boat containing the sample placed in a tube furnace, which was purged with dry Ar. The sample was heated, under flowing Ar, at a rate of 10° C./min to 850° C., and held at that temperature for 4 hours. The sample was then allowed to cool naturally to room temperature, and was then removed from the furnace. The yield of the product (CS/Ni-HT-85) was 0.1418 grams (44.5% weight loss).

Figure 3:
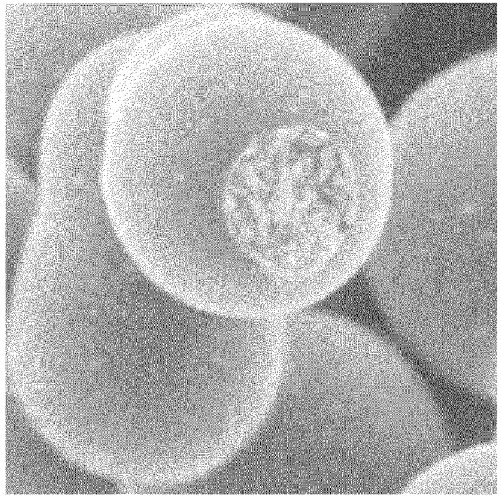
FIG. 3 is an SEM image of the hierarchically-structured product (CS/Ni-HT-85) obtained by heating CS/Ni-HT of FIG. 1 showing the core/shell microstructure of the product, and the nanostructure of the core.
Figure 4:
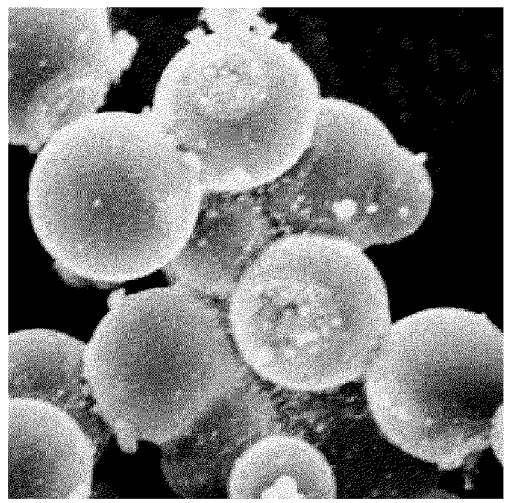
FIG. 4 is an SEM image of the hierarchically-structured product (CS/Ni-HT-85) of FIG. 3 showing the core/shell microstructure of the product, and the nanostructure of the core.

Examination of the product by SEM revealed that the product contained microbeads that were ca. 5-25μ in size, and which were covered with a relatively smooth coating that was open in one or (at most) a few places (FIGS. 3 and 4). These openings revealed that the microbeads had a core/shell microstructure, that the core had a nanostructure corresponding to a non-laminar aggregated of platelet like nanoparticles, and that the shell was relatively thin. We noted that, in some cases, a portion of the shell had peeled away from the core (FIG. 5).

Examination of the product by x-ray diffraction revealed that the product contained elemental Ni and highly graphitized carbon (FIG. 6). Using the usual formula (given above), the position of the 002 graphite peak showed that the degree of crystallinity was 90%. Scherrer broadening of the indicated that Ni was present as ca. 30 nm nanoparticles, and that graphite nanoparticles were about 10 nm in thickness. The product was strongly attracted to a magnet, which confirms the presence of metallic Ni. BET analysis ($N_2$ adsorption at 77K) revealed that the sample had a high surface area (165 $m^2/g$), which indicates a highly porous product.

Comparative Examples 1 and 7

The process described in Example 1 was repeated, except that the graphitization catalyst was omitted. This gave carbonaceous microspheres. This product was then treated according to the described in Example 7. The degree of crystallinity in the final product was 0.

Examples 8-12

The process described in Example 7 was repeated, except that other polysaccharides were used in place of corn starch. Except for microbead size, polydipersity, and surface area, the products were generally similar to CS/Ni-HT-85. Table 2 summarizes the properties of the products:

TABLE 2

| Ex. | Starch Type | Sample ID | Relative Size* | Relative Polydispersity* | Degree of Crystallinity | Surface Area |
|---|---|---|---|---|---|---|
| 7 | Corn | CS/Ni-HT-85 | — | — | 90% | 165 $m^2/g$ |
| 8 | Wheat | WS/Ni-HT-85 | Similar | Similar | 89% | 207 $m^2/g$ |
| 9 | Dextran | DT/Ni-HT-85 | Similar | Slightly higher | 91% | 154 $m^2/g$ |
| 10 | Rice | RS/Ni-HT-85 | Smaller | Similar | 90% | 254 $m^2/g$ |
| 11 | Potato | PS/Ni-HT-85 | Smaller | Much higher | 88% | 295 $m^2/g$ |
| 12 | Acacia | AC/Ni-HT-85 | Smaller | Much higher | 85% | 147 $m^2/g$ |

*relative to CS/Ni-HT-85

Example 13

The process in Example 7 was repeated. The product (CS/Ni-HT-85) was then treated with CO at 50° C. (Mond process). The product had similar structural features as CS/Ni-HT-85, except that the Ni nanoclusters were absent.

Example 14

The process in Example 7 was repeated. The product (CS/Ni-HT-85) was then treated with hydrochloric acid. The product had similar structural features as CS/Ni-HT-85, except that the Ni nanoclusters were absent.

Example 15

The process in Example (corn starch) was repeated. The product (CS/Ni-HT-85) was then treated with steam at 850° C. for four hours. SEM images of the product (CS/Ni-HT-85-S04) revealed that steam treatment removed a portion of the outer coating (FIG. 7). BET analysis ($N_2$ adsorption at 77K) revealed that the steam treatment increased the surface area to 532 $m^2/g$. X-ray diffraction indicates high degree of crystallinity.

Example 16

The process in Example 8 (wheat starch) was repeated. The product (WS/Ni-HT-85) was then treated with steam at 850° C. for four hours. SEM images of the product (WS/Ni-HT-85-S04) revealed that steam treatment removed a portion of the outer coating. BET analysis ($N_2$ adsorption at 77K) revealed that the steam treatment increased the surface area to 489 $m^2/g$. X-ray diffraction indicates high degree of crystallinity.

Examples 17-28

The process of Example 1 was repeated, except that other metal salts or metal salt mixtures were used in place of $Ni(NO_3)_2 \cdot 6H_2O$. The resulting products were then heat-treated, as described in Example 7. The resulting products were characterized by x-ray diffraction to determine degree of graphitization. The results (Table 3) show that the choice of the catalyst is important in determining the degree of crystallinity.

TABLE 3

| Example | Catalyst* | Degree of Crystallinity |
|---|---|---|
| Example 17 | Ni | 90% |
| Example 18 | Co | 82% |

TABLE 3-continued

| Example | Catalyst* | Degree of Crystallinity |
|---|---|---|
| Example 19 | Fe | 81% |
| Example 20 | Co/Ni | 91% |
| Example 21 | Fe/Ni | 87% |
| Example 22 | La | 34% |
| Example 23 | Cr | <5% |
| Example 24 | Mn | <5% |
| Example 25 | Cu | <5% |
| Example 26 | Zn | <5% |
| Example 27 | Mg | <5% |
| Example 28 | Sr | <5% |

*Catalysts were metal nitrates.

Example 29

The process in Example 7 was repeated. A small amount of the product (CS/Ni-HT-85) was suspended in N-methyl-2-pyrrolidone and then sonicated for 2 hours using a cell dismembrator (Fisher 550 with microtip probe). A portion of the resulting suspension was dropped onto a carbon-coated TEM grid which had been affixed to a purpose-built spin-coater. The grid was allowed to dry and the product was examined by transmission electron microscopy (TEM). TEM images revealed that dismembration had produced graphene sheets (FIG. 8).

While the present invention has been disclosed and described in terms of preferred embodiments, the invention is not limited to the preferred embodiments. For example, graphitic carbon microbeads can be modified for use in catalysis by subsequent addition of metal particles, or sintered to provide a carbon compact that can be used as electrodes, or as a component in carbon-carbon composites. Also, the biomass precursors can be high oxygen organic molecules other that sugars and starches, such as ethanol, acetic acid, and polymers such as polyethylene glycol and polyvinyl alcohol. In the claims that follow, any recitation of steps is not intended as a requirement that the steps be performed sequentially, or that one step be completed before another step is begun, unless explicitly so stated.

Example 30

90 mg of CS/Ni-HT-85, 10 mg polyvinylpyrrolidone, and a small amount of N-methyl-2-pyrrolidone were combined in an agate mortar and pestle and ground together to make a mull. Supercapitor electrodes were made by coating this material onto thin stainless steel disks, which were then cured at 100° C. Electrode performance was evaluated by cyclic voltammetry (FIG. 10) and charge/discharge cycles (FIG. 11) in aqueous potassium chloride. These results show that CS/Ni-HT-85 has high (>30 F/g) specific capacitance and is suitable for use in supercapacitors.

REFERENCES

[1] T. Li, C. Wang, Z. Liu, J. Zheng, H. Wang, "SEM Analysis of the Changes of Carbon Layer Structure of Mesocarbon Microbeads Heat-Treated at Different Temperatures", *Chinese Science Bulletin*, 49, 1105-1110 (2004).

[2] A. Mabuchi, K. Tokumitsu, H. Fujimoto, T. Kasuh, "Charge-Discharge Characteristics of the Mesophase Microbeads Heat-Treated at Different Temperatures", *Journal of the Electrochemical Society*, 142, 1041-1046 (1995).

[3] K. Tatsumi, N. Iwashita, H. Sakaebe, H. Shioyama, S. Higuchi, A. Mabuchi, H. Fujimoto, "The Influence of the Graphitic Structure on the Electrochemical Characteristics for the Anode of Secondary Lithium Batteries", *Journal of the Electrochemical Society*, 142, 716-720 (1995).

[4] Q. Wang, H. Li, L. Chen, X. Huang, "Monodispersed Hard Carbon Sphereules With Uniform Nanopores", *Carbon*, 39, 2211-2214 (2001).

[5] H. Marsh, F. Rodriguez-Reinoso, *"Activated Carbon"*, Elsevier Ltd., pp. 100-101 (2006).

[6] Z. Mao, H. Romine, M. Carel, "Coated Carbonaceous Particles Particularly Useful as Electrode Materials in Electrical Storage Cells, and Methods for Making the Same", U.S. Pat. No. 7,323,120 B2 (2008).

[7] S. K. Batabyal, C. Basu, A. R. Das, G. S. Sanyal, "Green Chemical Synthesis of Silver Nanowires and Microfibers using Starch", *Journal of Biobased Materials and Bioenergy*, 1, 143-147 (2007).

[8] S.-H. Yu, S. Cui, L. Li, K. Li, B. Yu, M. Antonietti, H. Colfen, "From Starch to Metal/Carbon Hybrid nanostructures: Hydrothermal Metal-Catalyzed Carbonization", *Advanced Materials*, 16, 1636-1640, (2004).

[9] Y.-Z. Mi, Y.-L. Liu, "A Simple Solvothermal Route to Synthesize Carbon Microspheres", *New Carbon Materials*, 24, 375-377, (2009).

What is claimed is:

1. A method for making hierarchically-structured carbon microbeads, the method comprising:
combining organic precursor having more than 20 wt % oxygen with a liquid or solid substance that will provide a liquid under solvothermal conditions and a graphitizing catalyst to form a mixture;
heating the mixture under solvothermal conditions to produce a carbonaceous material; and
carbonizing the resulting carbonaceous material to produce spherical graphitic carbon microbeads including a core/shell structure, wherein the spherical core contains graphitic nanoparticles and is substantially covered with a thin carbonaceous coating.

2. The method of claim 1 wherein the organic precursor comprises an alcohol, a glycol, a sugar, a polysaccharide, a starch, a cellulosic material, an ester, an amide, an amino acid, or a peptide.

3. The method of claim 1 wherein the organic precursor comprises a sugar or a starch.

4. The method of claim 1 wherein the organic precursor is the substance that forms the liquid under solvothermal conditions.

5. The method of claim 1 wherein the liquid or solid substance is water.

6. The method of claim 1 wherein the graphitizing catalyst is selected from the group consisting of: one or more metals, one or more metal compounds and a combination of one or more metals with one or more metal compounds.

7. The method of claim 6 wherein the graphitizing catalyst comprises a transition metal.

8. The method of claim 7 wherein the transition metal is Fe, Co, Ni, Ru, Rh, Pd, Os, Ir, or Pt.

9. The method of claim 1 wherein the solvothermal heating is conducted at a temperature between 150° C. to 500° C.

10. The method of claim 1 wherein the solvothermal heating is conducted at a temperature between 150° C. to 250° C.

11. The method of claim 1 wherein the carbonizing is conducted at a temperature between 400° C. to 3000° C.

12. The method of claim 1 wherein the carbonizing is conducted at a temperature between 400° C. to 2000° C.

13. The method of claim 1 wherein the carbonizing is conducted at a temperature between 400° C. to 1200° C.

14. The method of claim 1 wherein the carbonizing step comprises microwave treatment.

15. The method of claim 1 further comprising a removal step to remove residual graphitizing catalyst or other metals or metal compounds after the carbonizing step.

16. The method of claim 1 wherein the microbeads further contain small metal rich particles.

17. The method of claim 16 wherein the metal-rich particles are ferromagnetic, ferrimagnetic, or superparamagnetic.

18. The method of claim 1 wherein the microbeads are catalytically active.

19. The method of claim 1 further comprising a dismembration step performed on the microbeads after the carbonizing step to form graphene.

20. The method of claim 19 wherein the dismembration step is an ultrasonic dismembration step.

21. A method for making hierarchically-structured carbon microbeads, the method comprising:
combining organic precursor having more than 20 wt % oxygen with a liquid or solid substance that will provide a liquid under solvothermal conditions and a graphitizing catalyst to form a mixture;
heating the mixture under solvothermal conditions to produce a carbonaceous material; and
carbonizing the resulting carbonaceous material to produce spherical graphitic carbon microbeads including a core/shell structure, wherein the core contains graphitic nanoparticles and is substantially covered with a thin carbonaceous coating, wherein the graphitizing catalyst comprises a transition metal and wherein the transition metal is Co, or Ni.

22. A method for making hierarchically-structured carbon microbeads, the method comprising:
combining organic precursor having more than 20 wt % oxygen with a liquid or solid substance that will provide a liquid under solvothermal conditions and a graphitizing catalyst to form a mixture;
heating the mixture under solvothermal conditions to produce a carbonaceous material;
carbonizing the resulting carbonaceous material to produce spherical graphitic carbon microbeads including a core/shell structure wherein the spherical core contains graphitic nanoparticles and is substantially covered with a thin carbonaceous coating; and
activating the microbeads step to increase surface area of the microbeads after the heating step, wherein the activation step removes a portion of the coating while leaving the spherical core intact.

23. The method of claim 22 wherein the activation step is separate from and follows the carbonization step.

24. The method of claim 22 wherein the activation step is concurrent with the carbonization step.

25. The method of claim 22 wherein the activation step is a physical activation step.

26. The method of claim 22 wherein the activation step is a chemical activation step.

27. The method of claim 22 wherein the activation step comprises exposing the microbeads to one of the following: steam, oxygen, air, carbon dioxide, carbon monoxide, potassium hydroxide, zinc chloride.

28. The method of claim 22 wherein the activation step removes substantially all of the coating.

* * * * *